US 8,582,591 B2

(12) United States Patent
MacInnis et al.

(10) Patent No.: US 8,582,591 B2
(45) Date of Patent: Nov. 12, 2013

(54) METHOD AND SYSTEM FOR ESTABLISHING A QUEUING SYSTEM INSIDE A MESH NETWORK

(75) Inventors: Alexander G. MacInnis, Ann Arbor, MI (US); Thomas Quigley, Franklin, NC (US); Arya Behzad, Poway, CA (US); Jeyhan Karaoguz, Irvine, CA (US); John Walley, Ladera Ranch, CA (US); Mark Buer, Gilbert, AZ (US)

(73) Assignee: Broadcom Corporation, Irvine, CA (US)

( * ) Notice: Subject to any disclaimer, the term of this patent is extended or adjusted under 35 U.S.C. 154(b) by 939 days.

(21) Appl. No.: 11/864,215

(22) Filed: Sep. 28, 2007

(65) Prior Publication Data
US 2009/0022169 A1 Jan. 22, 2009

Related U.S. Application Data
(60) Provisional application No. 60/950,935, filed on Jul. 20, 2007.

(51) Int. Cl.
*H04L 12/54* (2013.01)
(52) U.S. Cl.
USPC ........... 370/429; 367/406; 367/412; 367/428; 709/226; 709/227; 709/238; 711/100
(58) Field of Classification Search
None
See application file for complete search history.

(56) References Cited

U.S. PATENT DOCUMENTS

| 2003/0161311 | A1* | 8/2003 | Hiironniemi | 370/392 |
| 2004/0125776 | A1* | 7/2004 | Haugli et al. | 370/338 |
| 2007/0032225 | A1* | 2/2007 | Konicek et al. | 455/417 |
| 2008/0019339 | A1* | 1/2008 | Raju et al. | 370/338 |

OTHER PUBLICATIONS

Seagate Technology LLC, Seagate D.A.V.E. (Digital Audio Video Experience) Transform the consumer digital content experience with the Seagate D.A.V.E. design concept, Data Sheet, 2007.
Seagate Technology LLC, Seagate D.A.V.E. (Digital Audio Video Experience) The portable storage platform that collects, plays and manages digital content, Product Overview, 2007.

* cited by examiner

*Primary Examiner* — Nicholas Sloms
(74) *Attorney, Agent, or Firm* — Thomas | Horstemeyer, LLP

(57) ABSTRACT

Wireless mobile communication (WMC) devices located in operating proximity of each other may be enabled to form a mesh (ad hoc wireless) network. WMC devices in a mesh network may form a queuing system wherein each WMC device may store data forwarded to and/or from other WMC devices in the mesh network. Each WMC device in the mesh network may have different queuing capability based on a plurality of factors that may comprise internal factors such as processing, storage, power, and/or connectivity. The mesh network may comprise an internal addressing scheme that may enable utilization of the queuing system whether or not WMC devices in the mesh network are communicatively coupled to external networks.

36 Claims, 6 Drawing Sheets

METHOD AND SYSTEM FOR ESTABLISHING A QUEUING SYSTEM INSIDE A MESH NETWORK

CROSS-REFERENCE TO RELATED APPLICATIONS/INCORPORATION BY REFERENCE

This patent application makes reference to, claims priority to and claims benefit from U.S. Provisional Application Ser. No. 60/950,935 filed on Jul. 20, 2007.

The above stated application is hereby incorporated herein by reference in its entirety.

FIELD OF THE INVENTION

Certain embodiments of the invention relate to wireless devices. More specifically, certain embodiments of the invention relate to a method and system for establishing a queuing system in a mesh network.

BACKGROUND OF THE INVENTION

The field of wireless communication has seen dramatic growth the last few years. In today's world, most people use their wireless devices for various purposes, business and personal, on a constant and daily basis. Society is truly becoming a wireless one. Numerous wireless solutions have been introduced, and have made a tremendous impact on everyday life.

For example, the use of Wireless Personal Area Networks (WPAN) has been gaining popularity in a great number of applications because of the flexibility and convenience in connectivity they provide. WPAN systems generally replace cumbersome cabling and/or wiring used to connect peripheral devices and/or mobile terminals by providing short distance wireless links that allow connectivity within very narrow spatial limits (typically, a 10-meter range). WPAN may be based on standardized technologies, for example Class 2 Bluetooth® (BT) technology. While WPAN may be very beneficial for certain applications, other applications may require larger service areas and/or capabilities.

To satisfy such needs, other technologies have been developed to provide greater wireless service. Wireless Local Area Networks (WLAN) systems may operate within a 100-meter range, for example. In contrast to the WPAN systems, WLAN provide connectivity to devices that are located within a slightly larger geographical area, such as the area covered by a building or a campus, for example. WLAN systems are generally based on specific standards, for example IEEE 802.11 standard specifications, and typically operate within a 100-meter range, and are generally utilized to supplement the communication capacity provided by traditional wired Local Area Networks (LANs) installed in the same geographic area as the WLAN system.

Other forms of wireless solutions have evolved from traditional land-based communication technologies. For instance, cellular phones have become just about an absolute necessity in today's world. While cellular technology was merely intended to add an element of mobility to the traditional telephony service, this technology has grown beyond that initial purpose. Many modern cellular technologies, including such technologies as GSM/GPRS/EDGE, UMTS, and CDMA2000, incorporate substantial data capabilities. Most of today's cellular services include such features as text messaging, video streaming, web browsing . . . etc.

Mobile wireless devices with various wireless technologies are another trend in the wireless world. For instance, WLAN systems may be operated in conjunction with WPAN systems to provide users with an enhanced overall functionality. For example, Bluetooth® technology may be utilized to connect a laptop computer or a handheld wireless terminal to a peripheral device, such as a keyboard, mouse, headphone, and/or printer, while the laptop computer or the handheld wireless terminal is also connected to a campus-wide WLAN network through an access point (AP) located within the building.

Devices aimed at taking advantage of the capabilities of wireless networks may be described as Wireless mobile communication (WMC) devices. Today's WMC devices may comprise such devices as cellular phones, PDA's, laptops, and/or other devices.

One of the issues that may arise with the use of WMC devices is the availability of wireless connectivity. Because WMC devices are typically use-on-the-move type devices, a WMC device, due to its user's movement, may be located outside the of wireless connectivity coverage area. For example, with such devices as mobile phones, it is not unusual for a user to drive out of cellular networks coverage area, especially when driving between towns. This may result in dropped calls or significantly degraded reception and/or services.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for establishing a connection outside a mesh by including network connectivity information in router configuration messages, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for establishing a queuing system in a mesh network. WMC devices may be enabled to communicate directly with other WMC devices that may be located within proximity of each other, thereby allowing peer-to-peer connectivity. WMC devices' peer-to-peer communication may be device-specific and thus limited to a class of devices based on type and/or make. Alternatively, a WMC devices' peer-to-peer connectivity may also be based on a standardized wireless connectivity interface, for example Bluetooth®. Such WMC devices peer-to-peer connectivity may be utilized to form a mesh (ad hoc wireless) network. WMC devices in a mesh network may form a queuing system wherein each WMC device in the mesh network may queue data forwarded from and/or to other WMC devices in the mesh network. The queuing system may be utilized to facilitate messaging between WMC devices in the mesh network and other WMC devices in the mesh network and/or external entities. A WMC device queuing availability may be based on a plurality of factors that may comprise processing load, storage space, power resources, and/or both internal and external connectivity of the device. An internal addressing scheme may be utilized in the mesh network wherein each WMC device in the mesh network may be assigned a unique internal address. The internal addressing scheme may be utilized in queuing operations.

Figure 1A:
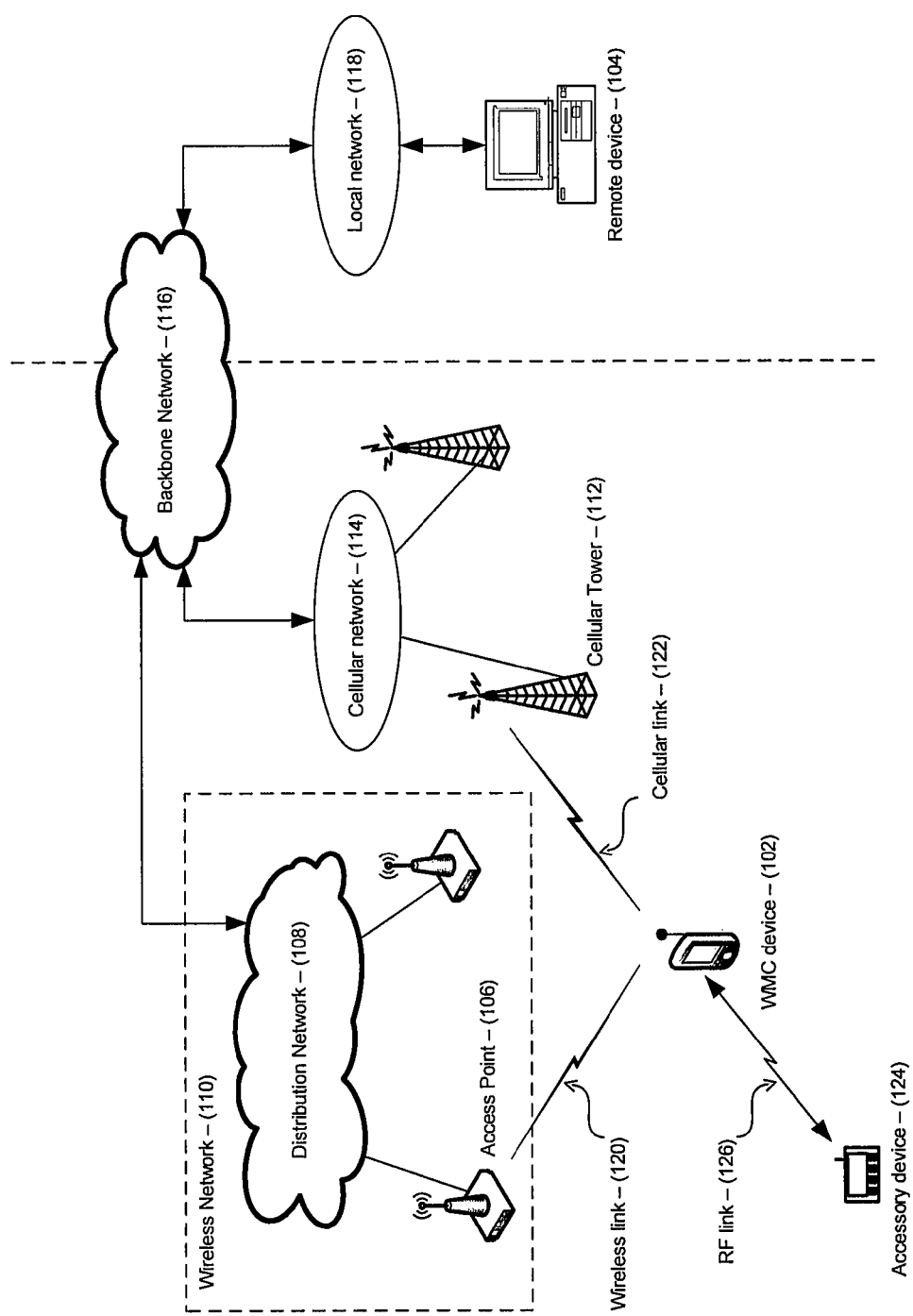
FIG. 1A is a block diagram that illustrates an exemplary model for setup that comprises a wireless mobile communication (WMC) device and a remote device, which may be utilized in accordance with an embodiment of the invention.

FIG. 1A is a block diagram that illustrates an exemplary model for setup that comprises a wireless mobile communication (WMC) device and a remote device, which may be utilized in accordance with an embodiment of the invention. Referring to FIG. 1A, there is shown a WMC device 102, a remote device 104, an access point 106, a distribution network 108, a wireless network 110, a cellular tower 112, a cellular network 114, a backbone network 116, a local network 118, a wireless link 120, a cellular link 122, an accessory device 124, and a RF link 126.

The WMC device 102 may comprise suitable logic, circuitry and/or code that may enable performing wireless mobile communication. For example, the WMC device 102 may be utilized to perform voice, video and/or text message peer-to-peer communication. A WMC device may comprise an end user device or an end user terminal device comprising a user interface. The WMC device 102 may also perform additional functionality comprising internet browsing, and/or video streaming.

The remote device 104 may comprise suitable logic, circuitry and/or code that may be enabled to communicate to with the WMC device 102. The invention may not be limited to a specific remote device, but may comprise, for example, a general purpose processing device, a specialized processing device, a specialized peripheral device, or any combination of suitable hardware, and/or code, which may be enabled to perform a job requested by the WMC device 102. For example, the remote device may comprise a home PC comprising fast processing subsystems and increased memory space. Such home PC may be better suited to perform processing and/or storage intensive tasks. For example, where necessary and/or feasible, the WMC device 102 may utilize the remote device 104 for Internet searches and/or for secure storage of data that may be created and/or maintained in the WMC device 102.

The wireless network 110 may comprise a plurality of the access point 106, the distribution network 108 and suitable logic, circuitry and/or code that may enable implementing a functional block corresponding to a wireless technology. Exemplary wireless technology may comprise for example the IEEE 802.11 (WLAN) or WiMAX (IEEE 802.16) architecture. The access point 106 may comprise suitable logic, circuitry, and/or code that may be utilized as access point necessary for the WMC device 102 to access the wireless network 110. The distribution network 108 may comprise suitable logic, circuitry, and/or code that may be adapted to operate as a backbone network that may be responsible for transport and link functionality for plurality of access points in the wireless network 110.

The cellular network 114 may comprise plurality of the cellular tower 112, and suitable logic, circuitry and/or code that may enable implementing a functional block corresponding to a cellular technology. Exemplary cellular technology may comprise cellular technologies that enable data services, including but not limited to, CDMA, WCDMA, CDMA1000, HSDPA, GSM, GPRS, EDGE, and UMTS.

The accessory device 124 may comprise suitable logic, circuitry and/or code that may enable performing some accessory functionality in conjunction with the use of the WMC device 102. For example, the accessory device may comprise a hands-free headset. The WMC device 102 may interact with the accessory device 124 over a short-range RF link 126. The RF link 126 may be based on a standardized technology for inter-device short range communication. For example, the RF link may correspond to a Bluetooth® connection or ZigBee connection between the accessory device 124 and the WMC device 102.

The local network 118 may comprise suitable logic, circuitry and/or code that may enable local connectivity. This local connectivity may comprise use of Local Area Network (LAN) technologies that enable data services, including but not limited to, IEEE 802.3 Ethernet. Other technologies may comprise WiMAX.

The backbone network 116 may comprise suitable logic, circuitry, and/or code that may be adapted to provide overall system connectivity between sub-networks. The wired network 116 may be enabled to interact with, and connect different wired and/or wireless technologies. For example, the backbone network may comprise a standard telephony network (POTS) that may enable data connectivity between different interface nodes linking wired and/or wireless networks comprising WLAN networks, WiMAX networks, cellular networks, and/or LAN networks.

In operation, the WMC device 102 may utilize the wireless link 120 to access the wireless network 110 via the access point 106. The WMC device 102 may also utilize the cellular link 122 to access the cellular network 114 via the cellular tower 112. The WMC device 102 may attempt to communicate with the remote device 104 via the wireless network 110 through the access point 106 and the distribution network 108. The distribution network 108 may enable transport and/or routing of messages and/or data sent from, and to the WMC device 102. The backbone network 116 enables connectivity between local networks, for example wireless network 110, and cellular network 114. The remote device 104 may receive communication from the WMC device 102 by interacting with the backbone network 116. Necessary protocol-based operations may be performed to facilitate the transmission of information through all the different components. This may comprise use of such protocols as IP, and SS7.

Once connected, the WMC device 102 may communicate with the remote device 104. The WMC device may attempt to exchange data, information, and/or messaging with the remote device 104. The data exchange between WMC device 102 and the remote 104 may be on behalf of another WMC device that may be in close operational proximity of the WMC device 102. The WMC device 102 may temporarily loss connectivity with the remote device 104. The loss of connectivity between the WMC device 102 and the remote device 104 may be caused, for example, by loss of the wireless link 120 and/or loss of the cellular link 122. The WMC device 102 may queue data destined for the remote device 104 during times of loss of connectivity between the two devices. Once the connectivity between the WMC device 102 and the remote device 104 is re-established, the WMC device 102 may transfer queued data to the remote device 104. The re-establishment of the connectivity between the WMC device 102 and the remote device 104 may be due, for example, to re-establishment of the wireless link 120 and/or the cellular link 122.

Figure 1B:
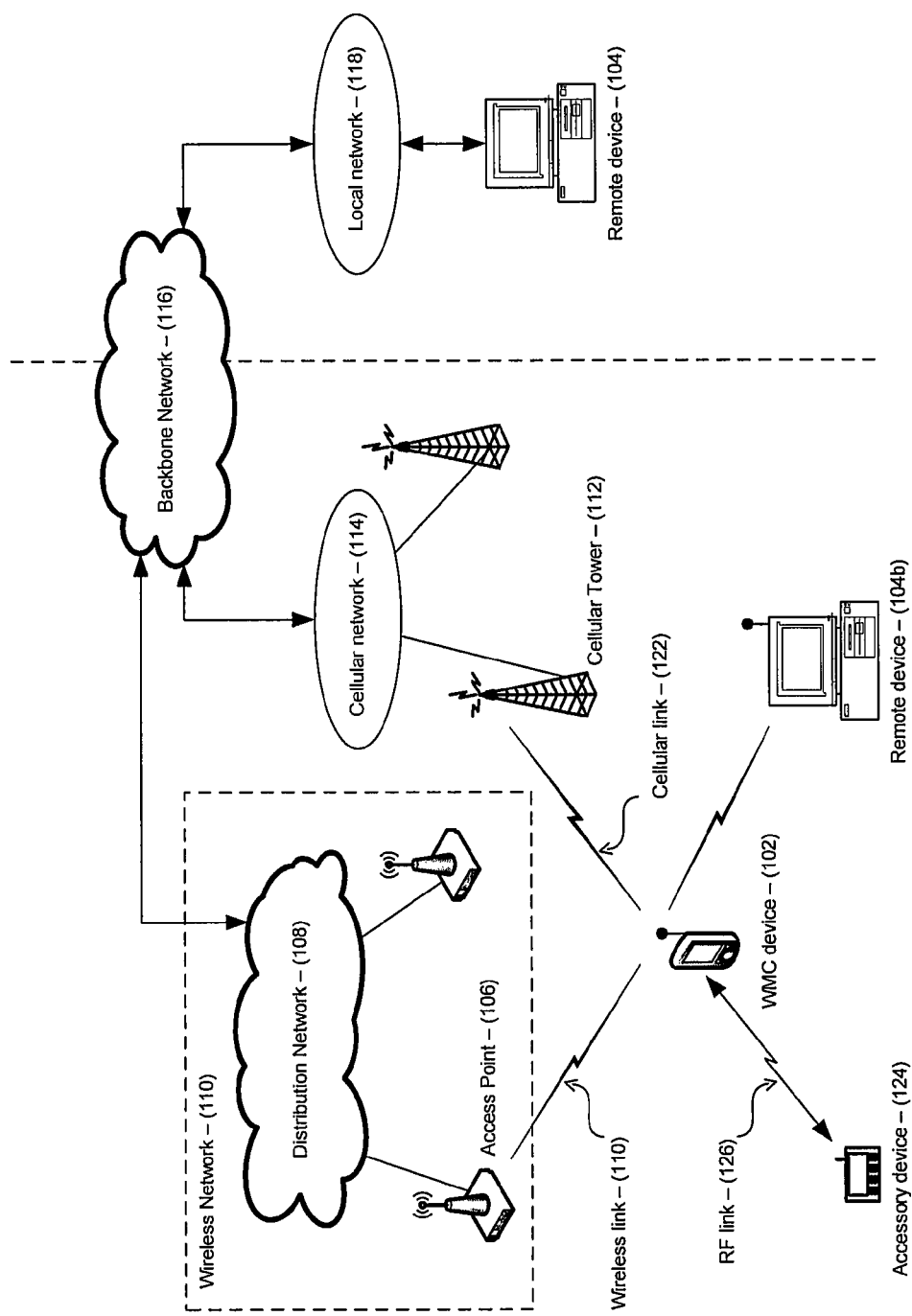
FIG. 1B is a block diagram that illustrates an exemplary model for setup that comprises a wireless mobile communication (WMC) device communicating directly via a wireless connection with a remote device, which may be utilized in accordance with an embodiment of the invention.

FIG. 1B is a block diagram that illustrates an exemplary model for setup that comprises a wireless mobile communication (WMC) device communicating directly via a wireless connection with a remote device, which may be utilized in accordance with an embodiment of the invention. Referring to FIG. 1B, there is shown the WMC device 102, the remote device 104, the access point 106, the distribution network 108, the wireless network 110, the cellular tower 112, the cellular network 114, the backbone network 116, the wireless link 120, the cellular link 122, the accessory device 124, the RF link 126, and a remote device 104b.

The remote device 104b may be similar to the remote device 104. However, the remote device 104b may also comprise suitable logic, circuitry, and/or code that may enable wireless connectivity. The WMC device 102 may communicate directly with the remote device 104b via a wireless connection.

In operation, the WMC device 102, the remote device 104, the access point 206, the distribution network 208, the wireless network 210, the cellular tower 212, the cellular network 214, the backbone network 216, the accessory device 224, and the RF link 226 may operate similar to FIG. 1A. The remote device 104b may operate similar to the remote device 104 as described in FIG. 1A; however, the WMC device 102 may communicate directly with the remote device 104b over a wireless connection. The remote device 104b may be operated as a stand-alone device, or it may be operated within a compatible network, wherein the remote device may be integrated. The ability to communicate directly with the remote device 104b may allow improved utilization of the remote device 104b by the WMC device 102. The direct wireless connection between the WMC device 102 and the remote device 104b may enable faster and more reliable communication between the two devices. The improvement may be due to the characteristics of the wireless connection between the remote device 104b and the WMC device 102, for example having greater bandwidth. The improvement may also be due to reduced delays compared to setups where the WMC device 102 may have to communicate with the remote device 104 through plurality of connecting networks and/or entities.

Once the WMC device 102 establishes connection with the remote device 104b, the WMC device 102 may utilize the remote device 104b similar to the remote device 104, as substantially described in FIG. 1A. The WMC device may attempt to exchange data, information, and/or messaging with the remote device 104b. The data exchange between WMC device 102 and the remote device 104b may be done on behalf of another WMC device that may be in close operational proximity of the WMC device 102. The WMC device 102 may temporarily lose direct connectivity with the remote device 104b. The WMC device 102 may queue data destined for the remote device 104b during times of loss of direct connectivity between the two devices. Once the direct connectivity between the WMC device 102 and the remote device 104b is re-established, the WMC device 102 may transfer queued data to the remote device 104b.

Figure 2:
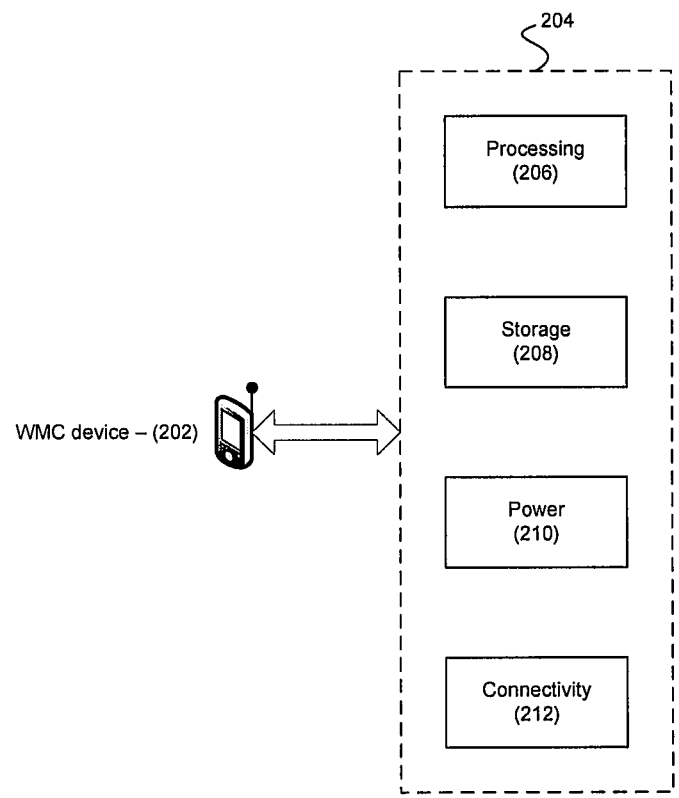
FIG. 2 is a block diagram that illustrates an exemplary wireless mobile communication (WMC) device that may be enabled to queue data, which may be utilized in accordance with an embodiment of the invention.

FIG. 2 is a block diagram that illustrates an exemplary wireless mobile communication (WMC) device that may be enabled to queue data, which may be utilized in accordance with an embodiment of the invention. Referring to FIG. 2, there is shown a WMC device 202, a queuing sub-system 204, processing resources 206, storage resources 208, power resources 210, and connectivity resources 212.

The WMC devices 202 may be substantially similar to the WMC device 102. The WMC device 202 may comprise the queuing sub-system 204, which may enable performing queuing-related operations. The queuing sub-system 204 may comprise suitable logic, circuitry and/or code that enable queuing of data received from and/or targeted for other WMC devices. The queuing sub-system 204 may utilize and/or depend in its operation on a plurality of resources, which may comprise the processing resources 206, the storage resources 208, the power resources 210, and the connectivity resources 212.

The processing resources 206 may comprise suitable logic, circuitry and/or code that enable performing processing operations in the WMC device 102. The processing operations may comprise such operations as data management and/or manipulation in the WMC device 102. The storage resources 208 may comprise suitable logic, circuitry and/or code that enable performing data storage operations in the WMC device 102. For example, the storage resources 208 may comprise memory storage resources in the WMC device 102. The power resources 210 may comprise suitable logic, circuitry and/or code that enable performing power operations in the WMC device 102. For example, the power resources 210 may comprise battery resources and additional resources necessary to manage utilization of the battery resources in the WMC device 102. The connectivity resources 212 may comprise available connectivity resources in the WMC device 102. For example, the connectivity resources 212 may comprise all the wireless connections between the WMC device 102 and other WMC devices and/or wireless networks.

In operation, the WMC device 102 may queue some data. The WMC device 102 ability to queue data may be determined by the queuing sub-system 204. When queuing data is requested in the WMC device 102, the queuing sub-system 204 may determine the ability to queue data based on availability of queuing-related resources. For example, the queuing system 204 may determine the availability of the processing resources 206, the storage resources 208, the power resources 210, and the connectivity resources 212. The queuing sub-system 204 may utilize the processing resources 206 to determine the processing load in the WMC device 102. Queuing data may comprise data management and/or manipulation, which may cause an increase in processing load in the WMC device 102. Subsequently, availability of queuing and/or size of data that may be queued may depend on availability of processing that may be necessary to perform necessary data management and/or manipulation for queuing operations. The queuing sub-system 204 may also utilize the storage resources 208 to determine the storage availability in the WMC device 102. Queuing data may comprise data storage in the WMC device 102, which may deplete, for example, storage space in the WMC device 102. Subsequently, availability of queuing and/or size of data that may be queued may depend on availability of storage that may be necessary to perform necessary data storage for queuing operations. The queuing sub-system 204 may also utilize the power resources 210 to determine the power availability in the WMC device 102. Queuing data, similar to any other operation performed in the WMC device 102, may comprise utilizing power in the WMC device 102. Subsequently, availability of queuing and/or size of data that may be queued may depend on availability of power that may be necessary to perform necessary queuing operations in the WMC device 102. The queuing sub-system 204 may also utilize the connectivity resources 212 to determine need for queuing in the WMC device 102. Queuing data may be performed in instances where the WMC device 102 may be expected to forward the queued-data. Subsequently, availability and/or non-availability of connectivity that may be necessary for future transmission of the queued-data may be relevant in determining availability of queuing and/or size of data that may be queued.

Figure 3:
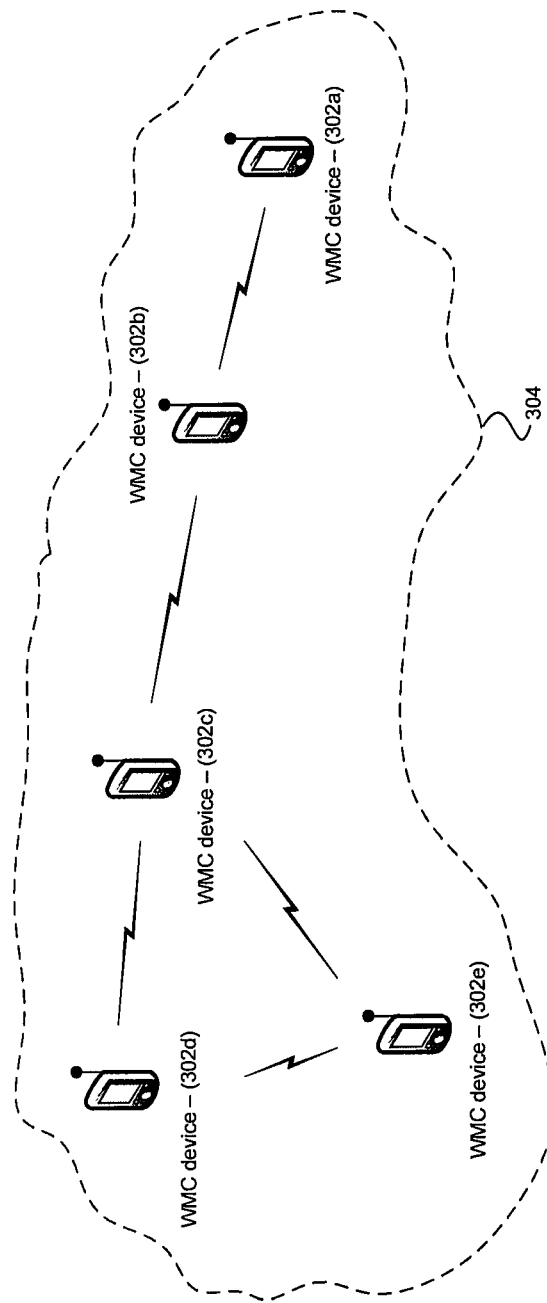
FIG. 3 is a block diagram that illustrates a plurality of WMC devices forming a mesh network, which may be utilized in accordance with an embodiment of the invention.

FIG. 3 is a block diagram that illustrates a plurality of WMC devices forming a mesh network, which may be utilized in accordance with an embodiment of the invention. Referring to FIG. 3, there is shown a WMC mesh network 304, a plurality of WMC devices 302a, 302b, 302c, 302d, and 302e.

The plurality of WMC devices 302a, 302b, 302c, 302d, and 302e may be substantially similar to the WMC device 202. The WMC mesh network 304 may comprise a plurality of WMC devices, and may also comprise suitable logic, circuitry and/or code that may enable forming mesh-like, ad hoc wireless networks of WMC devices.

In operation, the plurality of WMC devices 302a, 302b, 302c, 302d, and 302e may communicate with each other once the devices are within device-to-device operational proximity. Formation of device-to-devices connections between devices in the plurality of WMC devices 302a, 302b, 302c, 302d, and 302e may enable formation of the WMC mesh network 304.

Once the WMC mesh network 304 is formed, the WMC devices in the plurality of WMC devices 302a, 302b, 302c, 302d, and 302e may attempt to exchange data and/or messages. The data exchange may be utilized to perform communication between WMC devices in the WMC mesh network 304, or alternatively, the data exchange may be utilized to facilitate communication between a WMC device in the WMC mesh network 304 and some external entity; for example the remote device 104. Performing data exchange in the WMC network 304 may require data queuing in some of the WMC devices in the WMC mesh network 304. For example, the WMC device 302e may determine that the WMC device 302a may be the most likely candidate to forward data from the WMC device 302e to some external entity. The WMC device 302a may be unable to forward data received from the WMC device 302e due to loss of connectivity with the desired external entity. The WMC device 302a may queue the data received from the WMC device 302e until connectivity with desired external entity may be re-established. Determination of availability of queuing and/or size of data that may be queued may comprise utilizing queuing sub-system 204 in the WMC device 302a.

Furthermore, the WMC mesh network 304 may utilize an internal addressing scheme wherein each WMC device in the WMC mesh network 304 may be assigned a unique internal address. For example, the plurality of WMC devices 302a, 302b, 302c, 302d, and 302e may be assigned unique internal address identities. A WMC device in the WMC mesh network 304 may become communicatively coupled to an external network. For example, the WMC device 302a may become communicatively coupled to a WiFi network. The WMC device 302a may be assigned an address consistent with the external network. However, the WMC device 302a may also retain its internal address identity to enable remaining WMC devices in the WMC mesh network 304 to continue communicating with the WMC device 302a for data exchange and/or data queuing purposes.

In an embodiment of the invention, a WMC device joining the WMC mesh network 304 may determine its queuing availability utilizing its queuing sub-system 204. Furthermore, the queuing availability may continually and/or dynamically be updated as queuing-related resources may change. For example, power resources 210 may be relevant when determining data queuing and/or size of data that may be queued, as described in FIG. 2. Therefore, changes in the power resources 210 may cause changes in queuing availability in a WMC device in the WMC mesh network 304.

Figure 4A:
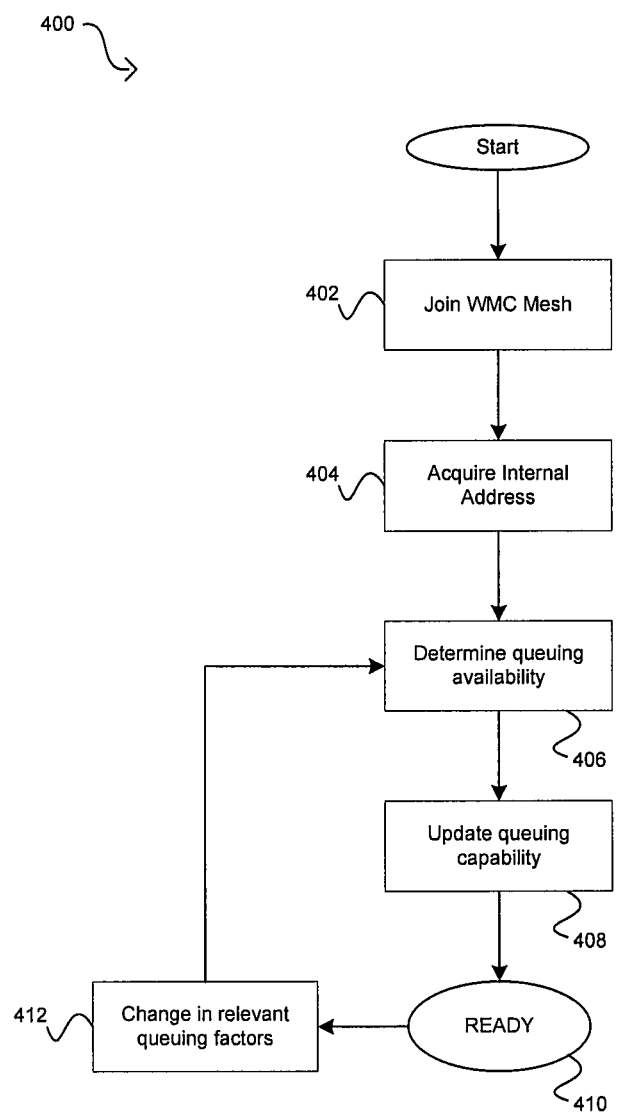
FIG. 4A is a flow chart that illustrates a WMC device joining a mesh network and its queuing system, in accordance with an embodiment of the invention.

FIG. 4A is a flow chart that illustrates a WMC device joining a mesh network and its queuing system, in accordance with an embodiment of the invention. Referring to FIG. 4A, there is shown flow chart 400. The flow chart may start when a WMC device comes into operational proximity of other WMC devices forming a mesh network, substantially similar to the mesh described in FIG. 3. In step 402, the WMC device may join the mesh network. The WMC device may utilize a specific device-to-device protocol and/or standard-based communication interface to interact with other WMC devices forming the WMC mesh network 304. For example, the WMC device may utilize, for example Bluetooth® or Ultra-Wideband (UWB) in peer-to-peer communications in joining the WMC mesh network 304. In step 404, the WMC device may be assigned an internal address. The WMC mesh network 304 may utilize an internal addressing scheme wherein each WMC device in the WMC mesh network 304 may be assigned a unique internal address to facilitate internal communication between WMC devices within the WMC mesh network 304. In step 406, the WMC device may determine its queuing availability. The WMC device may utilize its queuing sub-system 204 in determining availability of data queuing and/or size of data that maybe queued, substantially as described in FIG. 2. In step 408, the WMC device may determine its queuing capabilities within the WMC mesh network 304. The WMC device may utilize its queuing availability, and information derived from internal addressing scheme to determine, for example, devices in the WMC mesh network 304 that the WMC device may be enabled to queue data for, and/or devices that may be utilized for queuing data sent from the WMC device. In step 410, the WMC device is READY, wherein the WMC device may be actively participating in the WMC mesh operations and may be capable of performing queuing operations in the mesh network 304. The WMC device may receive data that may be forwarded to and/or from other WMC devices in the WMC mesh network 304, and/or the WMC device may utilize other devices in the WMC mesh network for queuing of data sent from the WMC device. In step 412, the WMC device may determine that changes to queuing-related factors may have occurred. This may comprise changes in the WMC device itself, comprising changes in the processing resources 206, the storage resources 208, the power resources 210, and/or connectivity resources 212. The process may then proceed back to step 406, wherein the queuing availability, and subsequently the queuing capability, of the WMC device may be updated.

Figure 4B:
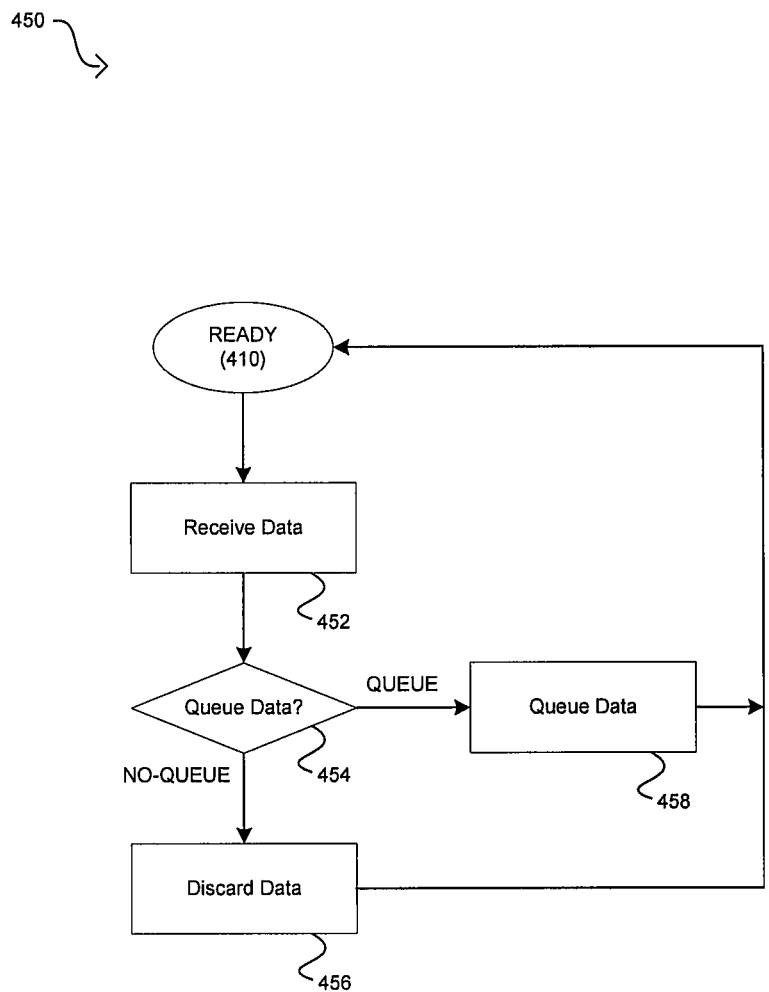
FIG. 4B is a flow chart that illustrates a WMC device in a mesh network performing queuing operations, in accordance with an embodiment of the invention.

FIG. 4B is a flow chart that illustrates a WMC device in a mesh network performing queuing operations, in accordance with an embodiment of the invention. Referring to FIG. 4B, there is shown flow chart 450. The process may initiate when a WMC device is in the "READY" state, substantially as described in step 410 of FIG. 4A, wherein the WMC device may be joined in the WMC mesh network 304, and may be actively participating in mesh operations, which may comprise performing queuing operations. In step 452, the WMC device may receive data that may be forwarded to and/or from other WMC devices in the WMC mesh network 304. In step 454, a determination as to whether the received data may be queued may be performed. The received data may need to be queued in situations where further forwarding of the data may be either not available or not required, but it may be anticipated that such further forwarding may subsequently become possible. For example the WMC device may be deemed a potential candidate for external connectivity, wherein received data may be queued until such point that the WMC device may become communicatively coupled to an external network. In determining whether received data may be queued, the WMC device may utilize its queuing capability, substantially as described in step 408 in FIG. 4A. In the instances that the outcome of the determination in step 454 indicates that no data should be queued, the WMC device may be incapable of queuing the received data. This may be due to plurality of factors, which may comprise internal limitations, for example lack of sufficient processing, storage, and/or power resources; or it may due to a determination that the WMC device may not be suitable for performing any further forwarding of the received data due to lack of necessary connectivity or lack of demand for the received data to be forwarded. In step 456, the received data may be discarded, and the process may return to the READY state.

Returning to step 454, in the instances that the outcome of the determination in step 454 indicates that data should be queued, the WMC device may be capable of queuing the received data. In step 458, the received data may be queued in the WMC device. The received data may be stored, for example, within the WMC device storage resources until further forwarding of the queued data may subsequently become possible. The process may then return to the READY state.

Various embodiments of the invention may comprise a method and system for establishing a queuing system in a mesh network. The WMC devices 302a, 302b, 302c, 302d, and 302e may be enabled to communicate directly with each other when they may be located in sufficient proximity of each other to form mesh network 304. The WMC devices 302a, 302b, 302c, 302d, and 302e in the mesh network 304 may form a queuing system wherein each WMC device in the mesh network 304 may queue data forwarded from and/or to other WMC devices in the mesh network 304. The queuing system may be utilized to facilitate messaging between the WMC devices in the mesh network 304 and other WMC devices in the mesh network and/or external entities. A WMC device queuing availability may be based on a plurality of factors that may comprise processing load, storage space, power resources, and/or both internal and external connectivity of the device. An internal addressing scheme may be utilized in the mesh network 304 wherein each WMC device in the mesh network may be assigned a unique internal address. The internal addressing scheme may be utilized in queuing operations.

Another embodiment of the invention may provide a machine-readable storage, having stored thereon, a computer program having at least one code section executable by a machine, thereby causing the machine to perform the steps as described herein for establishing a queuing system in a mesh network.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for improving wireless devices, the method comprising:

in a first wireless mobile peer communication device:

establishing a connection to a mesh network that comprises a plurality of wireless mobile peer communication devices when said first wireless mobile peer communication device is in operating proximity of one or more other wireless mobile peer communication devices in said mesh network, wherein, in said mesh network, the first wireless mobile peer communication device is capable of serving as a relay for said other wireless mobile peer communication devices, wherein a message is routed through the mesh network, from one wireless mobile peer communication device to another wireless mobile peer communication device, until a destination is reached;

determining availability of queuing resources within said first wireless mobile peer communication device for queuing of received data sent from another wireless mobile peer communication device and destined to be forwarded to one or more remaining wireless mobile peer communication devices in said mesh network; and queuing in said first wireless mobile peer communication device based on said determined availability of said queuing resources, said received data sent from another wireless mobile peer communication device and destined to be forwarded to said one or more remaining wireless mobile peer communication devices in said mesh network, wherein a size limit for said received data that is allowed to be queued is further determined based on said determined availability of said queuing resources when the availability of said queuing resources is determined to be currently available for storing said received data sent from another wireless mobile peer communication device and destined to be forwarded to one or more remaining wireless mobile peer communication devices in said mesh network, wherein said received data is discarded when the availability of said queuing resources is determined to not be currently available for storing said received data sent from another wireless mobile peer communication device and destined to be forwarded to one or more remaining wireless mobile peer communication devices in said mesh network.

2. The method according to claim 1, wherein the plurality of wireless mobile peer communication devices in said mesh network is respectively assigned a unique internal address.

3. The method according to claim 2, comprising queuing said received data utilizing said unique internal address.

4. The method according to claim 1, comprising dynamically re-determining availability of said queuing resources.

5. The method according to claim 1, wherein said queuing resources comprise processing, storage, power, internal connectivity within said mesh network, and external connectivity outside of said mesh network.

6. The method according to claim 1, comprising resolving access competition while performing said queuing.

7. The method according to claim 6, comprising performing said resolution of access competition based on priority.

8. The method according to claim 7, wherein said priority is based on an identity of a corresponding wireless mobile peer communication device that sent said received data.

9. The method according to claim 7, wherein said priority comprises traffic priority based on type of said received data.

10. The method according to claim 6, wherein said resolution of access competition comprises determining suitability and ability to forward said received data.

11. A non-transitory machine-readable storage having stored thereon, a computer program having at least one code section for improving wireless devices, the at least one code section being executable by a machine for causing the machine to perform steps comprising:

establishing a connection by a first wireless mobile peer communication device to a mesh network that comprises a plurality of wireless mobile peer communication devices when said wireless mobile peer communication devices is in operating proximity of one or more other wireless mobile peer communication devices in said mesh network, wherein, in said mesh network, the first wireless mobile peer communication device is capable of serving as a relay for said other wireless mobile peer communication devices, wherein a message is routed through the mesh network, from one wireless mobile peer communication device to another wireless mobile peer communication device, until a destination is reached;

determining availability of queuing resources within said first wireless mobile peer communication device for queuing of received data sent from another wireless mobile peer communication device and destined to be forwarded to one or more remaining wireless mobile peer communication devices in said mesh network; and queuing in said first wireless mobile peer communication device based on said determined availability of said queuing resources, said received data sent from another wireless mobile peer communication device and destined to be forwarded to said one or more remaining wireless mobile peer communication devices in said mesh network, wherein a size limit for said received data that is allowed to be queued is further determined based on said determined availability of said queuing resources when the availability of said queuing resources is determined to be currently available for storing said received data sent from another wireless mobile peer communication device and destined to be forwarded to one or more remaining wireless mobile peer communication devices in said mesh network, wherein said received data is discarded when the availability of said queuing resources is determined to not be currently available for storing said received data sent from another wireless mobile peer communication device and destined to be forwarded to one or more remaining wireless mobile peer communication devices in said mesh network.

12. The machine-readable storage according to claim 11, wherein the plurality of wireless mobile peer communication devices in said mesh network is assigned a unique internal address.

13. The machine-readable storage according to claim 11, wherein said at least one code section comprises code for queuing said received data utilizing a unique internal address.

14. The machine-readable storage according to claim 11, wherein said at least one code section comprises code for dynamically re-determining availability of said queuing resources.

15. The machine-readable storage according to claim 11, wherein said queuing resources comprise processing, storage, power, internal connectivity within said mesh network, and external connectivity outside of said mesh network.

16. The machine-readable storage according to claim 11, wherein said at least one code section comprises code for resolving access competition while performing said queuing.

17. The machine-readable storage according to claim 16, wherein said at least one code section comprises code for performing said resolution of access competition based on priority.

18. The machine-readable storage according to claim 17, wherein said priority is based on an identity of a corresponding wireless mobile peer communication device that sent said received data.

19. The machine-readable storage according to claim 17, wherein said priority comprises traffic priority based on type of said received data.

20. The machine-readable storage according to claim 16, wherein said resolution of access competition comprises determining suitability and ability to forward said received data.

21. A system for improving wireless devices, the system comprising:

one or more processors or circuits for use in a first wireless mobile peer communication device, said one or more processors or circuits being operable to establish a connection to a mesh network that comprises a plurality of wireless mobile peer communication devices when said first wireless mobile peer communication device is in operating proximity of one or more other wireless mobile peer communication devices in said mesh network, wherein, in said mesh network, the first wireless mobile peer communication device is capable of serving as a relay for said other wireless mobile peer communication devices, wherein a message is routed through the mesh network, from one wireless mobile peer communication device to another wireless mobile peer communication device, until a destination is reached;

said one or more processors or circuits are operable to determine availability of queuing resources within said first wireless mobile peer communication device for queuing of received data sent from another wireless mobile peer communication device and destined to be forwarded to one or more remaining wireless mobile peer communication devices in said mesh network; and said one or more processors or circuits are operable to queue in said first wireless mobile peer communication device based on said determined availability of said queuing resources, said received data sent from another wireless mobile peer communication device and destined to be forwarded to said one or more remaining wireless mobile peer communication devices in said mesh network, wherein a size limit for said received data that is allowed to be queued is further determined based on said determined availability of said queuing resources when the availability of said queuing resources is determined to be currently available for storing said received data sent from another wireless mobile peer communication device and destined to be forwarded to one or more remaining wireless mobile peer communication devices in said mesh network, wherein said received data is discarded when the availability of said queuing resources is determined to not be currently available for storing said received data sent from another wireless mobile peer communication device and destined to be forwarded to one or more remaining wireless mobile peer communication devices in said mesh network.

22. The system according to claim 21, wherein the plurality of wireless mobile peer communication devices in said mesh network is assigned a unique internal address.

23. The system according to claim 21, wherein said one or more processors or circuits are operable to queue said received data utilizing a unique internal address.

24. The system according to claim 21, wherein said one or more processors or circuits are operable to dynamically re-determine availability of queuing resources.

25. The system according to claim 21, wherein said queuing resources comprise processing, storage, power, internal connectivity within said mesh network, and external connectivity outside of said mesh network.

26. The system according to claim 21, wherein said one or more processors or circuits are operable to resolve access competition while performing said queuing.

27. The system according to claim 26, wherein said one or more processors or circuits are operable to perform said resolution of access competition based on priority.

28. The system according to claim 27, wherein said priority is based on an identity of a corresponding wireless mobile peer communication device that sent said received data.

29. The system according to claim 27, wherein said priority comprises traffic priority based on type of said received data.

30. The system according to claim 26, wherein said resolution of access competition comprises determining suitability and ability to forward said received data.

31. The method according to claim 1, comprising determining availability of external connectivity via said wireless mobile peer communication device.

32. The method according to claim 31, comprising communicating said queued received data to one or more devices external to said mesh network based on said determined availability of external connectivity.

33. The machine-readable storage according to claim 11, wherein said at least one code section comprises code for determining availability of external connectivity via said plurality of wireless mobile peer communication device.

34. The machine-readable storage according to claim 33, wherein said at least one code section comprises code for communicating said queued received data to one or more devices external to said mesh network based on said determined availability of external connectivity.

35. The system according to claim 21, wherein said one or more processors or circuits are operable to determine availability of external connectivity via said wireless mobile peer communication device.

36. The system according to claim 35, wherein said one or more processors or circuits are operable to communicate said queued received data to one or more devices external to said mesh network based on said determined availability of external connectivity.

* * * * *